United States Patent [19]

Miyoshi et al.

[11] Patent Number: 5,922,293
[45] Date of Patent: Jul. 13, 1999

[54] PROCESS FOR PURIFYING EXHAUST GASES

[75] Inventors: Naoto Miyoshi; Mareo Kimura; Yuzo Kawai; Yoko Kumai, all of Nagoya, Japan

[73] Assignee: Toyota Jidosha Kabushiki Kaisha, Aichi-Ken, Japan

[21] Appl. No.: 08/717,924

[22] Filed: Sep. 23, 1996

Related U.S. Application Data

[63] Continuation of application No. 08/338,855, Nov. 14, 1994., abandoned

[30] Foreign Application Priority Data

Nov. 17, 1993 [JP] Japan .................................. 5-288302

[51] Int. Cl.$^6$ ............................ B01D 53/60; B01D 53/94
[52] U.S. Cl. ..................................... 423/213.5; 423/239.1; 60/274
[58] Field of Search .................................. 423/213.5, 247, 423/212, 213.2, 239.1, 239.2, 244.02, 245.1; 60/274

[56] References Cited

U.S. PATENT DOCUMENTS

| | | | |
|---|---|---|---|
| 4,294,726 | 10/1981 | Bozon et al. | 252/462 |
| 4,497,783 | 2/1985 | Barber | 423/213.5 |
| 4,654,319 | 3/1987 | Kim et al. | 502/304 |
| 4,755,499 | 7/1988 | Neal et al. | 502/415 |
| 4,780,447 | 10/1988 | Kim et al. | 502/234 |
| 4,904,633 | 2/1990 | Ohata et al. | 502/304 |
| 4,921,829 | 5/1990 | Ozawa | 423/213.5 |
| 4,927,799 | 5/1990 | Matsumoto et al. | 502/303 |
| 5,041,407 | 8/1991 | Williamson et al. | 502/303 |
| 5,075,275 | 12/1991 | Murakami et al. | 502/303 |
| 5,075,276 | 12/1991 | Ozawa et al. | 423/213.5 |
| 5,185,305 | 2/1993 | Subramanian et al. | 502/65 |
| 5,208,202 | 5/1993 | Muramatsu et al. | 423/213.2 |
| 5,208,203 | 5/1993 | Horiuchi et al. | 502/302 |
| 5,236,879 | 8/1993 | Inoue et al. | 502/73 |
| 5,268,346 | 12/1993 | Ino et al. | 502/304 |
| 5,271,916 | 12/1993 | Vanderborgh et al. | 423/246 |
| 5,388,406 | 2/1995 | Takeshima et al. | 60/297 |
| 5,402,641 | 4/1995 | Katoh et al. | 60/285 |
| 5,412,945 | 5/1995 | Katoh et al. | 60/285 |

FOREIGN PATENT DOCUMENTS

| | | |
|---|---|---|
| 0 485 180 | 5/1992 | European Pat. Off. . |
| 0 488 250 | 6/1992 | European Pat. Off. . |
| 0 507 590 | 10/1992 | European Pat. Off. . |
| 0 556 554 | 8/1993 | European Pat. Off. . |
| 562516 | 9/1993 | European Pat. Off. ............ 423/213.5 |
| 2518536 | 10/1975 | Germany . |
| 38-03122 | 7/1979 | Germany . |
| 53-19986 | 2/1978 | Japan . |
| 5-317652 | 12/1993 | Japan . |
| 92 04965 | 4/1992 | WIPO . |

*Primary Examiner*—Michael Lewis
*Assistant Examiner*—Peter DiMauro
*Attorney, Agent, or Firm*—Oliff & Berridge, PLC

[57] ABSTRACT

A catalyst for purifying carbon monoxide, hydrocarbons and nitrogen oxides in exhaust gases at the stoichiometric point or in oxygen-rich atmospheres, is disclosed, and it includes a support in which at least one element selected from the group consisting of alkali metals, alkaline-earth metals and rare-earth elements including La is dissolved in titania to form a solid solution, and a noble metal catalyst ingredient loaded on the support. A process for purifying, by bringing the exhaust gases into contact with the catalyst, is also disclosed.

19 Claims, No Drawings

PROCESS FOR PURIFYING EXHAUST GASES

This is a Continuation of application Ser. No. 08/338,855 filed Nov. 14, 1994, now abandoned.

BACKGROUND OF THE INVENTION

1. Field of the Invention

The present invention relates to a catalyst for purifying exhaust gases and a process for purifying exhaust gases. More particularly, it relates to the catalyst and the process which can efficiently purify nitrogen oxides ($NO_x$) in the exhaust gases whose oxygen concentrations are at the stoichiometric point or more than required for oxidizing carbon monoxide (CO) and hydrocarbons (HC) therein.

2. Description of Related Art

As catalysts for purifying automotive exhaust gases, there have been employed 3-way catalysts so far which oxidize CO and HC and reduce $NO_x$ to purify the exhaust gases. For example, the 3-way catalysts have been known widely which comprise a heat resistant support formed of cordierite, a catalyst carrier layer formed of gamma-alumina and disposed on the support, and a noble metal selected from the group consisting of Pt, Pd and Rh and loaded on the catalyst carrier layer.

The purifying performance of the 3-way catalysts for purifying exhaust gases depends greatly on the air-fuel ratio (A/F) of automotive engine. For instance, when the air-fuel weight ratio is larger than 14.6, i.e., when the fuel concentration is low (or on the fuel-lean side), the oxygen concentration is high in exhaust gases. Accordingly, the oxidation reactions purifying CO and HC are active, but the reduction reactions purifying $NO_x$ are inactive. On the other hand, when the air-fuel ratio is smaller than 14.6, i.e., when the fuel concentration is higher (or on the fuel-rich side), the oxygen concentration is low in exhaust gases. Accordingly, the oxidation reactions are inactive, but the reduction reactions are active.

Moreover, when driving automobiles, especially when driving automobiles in urban areas, the automobiles are accelerated and decelerated frequently. Consequently, the air-fuel ratio varies frequently in the range of from the values adjacent to the stoichiometric point (or the theoretical air-fuel ratio: 14.6) to the fuel-rich side. In order to satisfy the low fuel consumption requirement during the driving conditions such as in the above-described urban areas, it is necessary to operate the automobiles on the fuel-lean side where the air-fuel mixture containing oxygen as excessive as possible is supplied to the engines. Hence, it has been desired to develop a catalyst which is capable of adequately purifying $NO_x$ even on the fuel-lean side (i.e., in the oxygen-rich atmospheres).

In view of the aforementioned circumstances, the applicants of the present invention applied for a Japanese Patent for a novel catalyst under Japanese Patent Application No. 4-130,904 (Japanese Unexamined Patent Publication (KOKAI) No. 5-317,652). On this catalyst, there are loaded an alkaline-earth metal oxide and Pt. In the catalyst, during the fuel-lean side (i.e., in the oxygen-rich atmospheres) driving, $NO_x$ is adsorbed on the alkaline-earth metal elements, and it reacts with the reducing gas such as HC and the like to be purified. As a result, the catalyst exhibits superb $NO_x$ purifying performance during the fuel-lean side (i.e., in the oxygen-rich atmospheres) driving.

The catalyst proposed in Japanese Unexamined Patent Publication (KOKAI) No. 5-317,652 is believed to provide the advantageous effect as follows: the alkaline-earth metal oxides, for example, barium oxide loaded on the support, react with $NO_x$ to produce nitrates, e.g., $Ba(NO)_3$. Thus, $NO_x$ is adsorbed on the support of the catalyst in the form of the alkaline-earth metal nitrates.

However, the exhaust gases usually contain $SO_2$ which is produced by burning sulfur (S) contained in the fuel. Further, the catalyst ingredient oxidizes $SO_2$ to $SO_3$ in the oxygen-rich atmospheres (i.e., on the fuel-lean side). Still further, $SO_3$ reacts readily with water vapor also contained in the exhaust gases to produce sulfuric acid. It has been revealed that the resulting sulfuric acid reacts with the alkaline-earth metal elements to produce alkaline-earth metal sulfites and alkaline-earth metal sulfates, thereby poisoning the alkaline-earth metal elements. Specifically, when the alkaline-earth metal elements are turned into the sulfites and sulfates, they hardly adsorb $NO_x$ thereon. As a result, the catalyst proposed in Japanese Unexamined Patent Publication (KOKAI) No. 5-317,652 suffers from a drawback in that it is deteriorated in terms of the $NO_x$ purifying performance after it is subjected to a durability test.

SUMMARY OF THE INVENTION

The present invention has been developed in view of the aforementioned circumstances. It is therefore an object of the present invention to further improve the catalyst proposed in Japanese Unexamined Patent Publication (KOKAI) No. 5-317,652 in terms of the $NO_x$ purifying performance after it is subjected to a durability test.

In accordance with the present invention, a catalyst can solve the aforementioned problems. A catalyst according to the present invention is for purifying carbon monoxide, hydrocarbons and nitrogen oxides in exhaust gases at the stoichiometric point or in oxygen-rich atmospheres whose oxygen concentrations are more than required for oxidizing the components to be oxidized therein, thereby purifying the exhaust gases, and it comprises:

a support in which at least one element selected from the group consisting of alkali metals, alkaline-earth metals and rare-earth elements including La is dissolved in titania to form a solid solution; and a noble metal catalyst ingredient loaded on the support.

A process according to the present invention is for purifying carbon monoxide, hydrocarbons and nitrogen oxides at the stoichiometric point or in exhaust gases in oxygen-rich atmospheres, thereby purifying the exhaust gases, and it comprises the steps of:

bringing exhaust gases at the stoichiometric point or in oxygen-rich atmospheres, whose oxygen concentrations are more than required for oxidizing the components to be oxidized therein, into contact with a catalyst:

the catalyst, comprising:

a support in which at least one element selected from the group consisting of alkali metals, alkaline-earth metals and rare-earth elements including La is dissolved in titania to form a solid solution; and a noble metal catalyst ingredient loaded on the support.

As for the support, the whole of the support can be formed of titania in which at least one element selected from the group consisting of the alkali metals, the alkaline-earth metals and the rare-earth elements including La is dissolved to form a solid solution (hereinafter simply referred to as a "titania solid solution"). Further, in order to constitute the support, a honeycomb member or a powdered member (e.g., pelletized member) formed of cordierite or heat resistant metal can be coated with the titania solid solution.

In the titania solid solution, one of the alkali metals, the alkaline-earth metals and the rare-earth elements including La or a plurality of them can be dissolved As for the dissolving amount, it is preferable to dissolve them in an amount of from 0.01 to 0.2 mole, further preferably from 0.05 to 0.1 mole, with respect to 100 grams (1.25 moles) of titania. When the dissolving amount is less than 0.01 mole with respect thereto, the resulting catalysts cannot be improved in terms of the $NO_x$ purifying performance after a durability test. When the dissolving amount is more than 0.1 mole with respect thereto, the $NO_x$ purifying performance improvement saturates.

As for the noble metal catalyst ingredient, it is possible to select one or more elements from the group consisting of Pt, Pd and Rh. Concerning the loading amount of the noble metal catalyst ingredient, it is preferable to load them on the support in an amount of from 0.5 to 3 grams, further preferably from 1.0 to 2.0 grams, with respect to 1 liter of the support. When the loading amount is less than 0.5 grams with respect thereto, the resulting catalysts are deteriorated in terms of purifying performance. When the loading amount is more than 3 grams with respect thereto, the purifying performance improvement saturates and such loading amount only pushes up the manufacturing cost of the resulting catalysts.

In accordance with the present invention, the titania solid solution constitutes the support. The titania solid solution adsorbs $SO_x$ and $NO_x$ thereon, but, in the atmosphere at the stoichiometric point or in the fuel-rich atmospheres, it decomposes and releases the $SO_x$ at low temperatures. Thus, titania solid solution satisfactorily contributes to the $NO_x$ adsorption. Accordingly, in the atmosphere at the stoichiometric point or in the fuel-rich atmospheres, the $NO_x$ adsorbed on the titania solid solution reacts with CO and HC in the exhaust gases, and it is reduced and purified to $N_2$ and at the same time the CO and HC are oxidized and purified.

Due the above-described mechanism, it is believed that the $SO_x$ is little accumulated and thereby the $NO_x$ adsorbing capability is inhibited from degrading after a durability test, and consequently that the present catalyst can be improved in terms of the $NO_x$ purifying performance after a durability test.

In the titania solid solution, it is believed that the alkali metals, the alkaline-earth metals and the rare-earth elements including La have a small grain diameter, and that they do not grow as the crystals of their sulfates. In other words, their sulfates are likely to decompose with ease. Hence, these are believed to some of the reasons behind the highly kept $NO_x$ purifying performance of the present catalyst after a durability test.

As having been described so far, the present catalyst for purifying exhaust gases can exhibit favorable $NO_x$ purifying performance even after it is subjected to a durability test. In accordance with the present exhaust gas purifying process, $NO_x$ can be purified constantly and efficiently even during driving on the fuel-lean side (i.e., in the oxygen-rich atmospheres).

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment
(Preparation of Titania Solid Solution)

1 liter of an aqueous lanthanum nitrate solution having a concentration of 1 mole/liter was adsorbed to 1 kg of a titania powder. The thus adsorbed titania powder was dried, and calcined at 800° C. for 2 hours. The resulting pulverized substance was subjected to an X-ray diffraction analysis. It was verified that La was dissolved in the titania. Further, it was revealed that the titania solid solution can be produced when the adsorbed titania powder was calcined at a temperature of approximately 600° C. or more.

(Preparation of Catalyst)

100 parts by weight of the thus obtained titania solid solution powder was mixed with 70 parts by weight of titania sol containing titania in an amount of 15% by weight and 30 parts by weight of distilled water, thereby preparing a slurry for coating Then, a plurality of honeycomb supports formed of cordierite were immersed into the slurry, and thereafter each of them was blown to blow away the slurry in excess. Each of the supports was dried at 110° C. for 1 hour, and each of them was calcinated at 600° C. for 1 hour, thereby preparing a support having a coating layer thereon. The coating layer was thus coated on the honeycomb support in an amount of 100 grams with respect to 1 liter of the honeycomb support, and La was dissolved in the titania solid solution in an amount of 0.1 mole with respect to 1 liter of the honeycomb support.

Each of the supports having the coating layer thereon was immersed into an aqueous platinum dinitrodiammine solution having a predetermined concentration, and thereafter it was blown to blow away the water droplets in excess. After the blowing, each of the supports was dried at 110° C. for 1 hour, and thereafter it was calcined at 250° C. for 1 hour, thereby loading Pt thereon. The loading amount of Pt was 1.5 grams with respect to 1 liter of the honeycomb support.

TABLE 1

| | Loading Amount, Noble Catalyst Ingredient (gram/liter) | | | | Dissolving Amount, Element (Alkali Metal, Alkaline-earth Metal, Rare-Earth Element) to be Dissolved in Titania (mole/liter) | | | | | | | | Initial Conversion (%) | | | Conversion after Durability Test (%) | | |
|---|---|---|---|---|---|---|---|---|---|---|---|---|---|---|---|---|---|---|
| | Pt | Pd | Rh | La | Y | Ca | Sr | Ba | Li | Na | K | HC | CO | NOx | HC | CO | NOx |
| 1st Pref. Embodiment | 1.5 | — | — | 0.1 | — | — | — | — | — | — | — | 98 | 100 | 72 | 98 | 100 | 58 |
| 2nd Pref. Embodiment | 1.5 | — | — | — | 0.1 | — | — | — | — | — | — | 98 | 100 | 70 | 97 | 100 | 55 |
| 3rd Pref. Embodiment | 1.5 | — | 0.1 | — | — | 0.1 | — | — | — | — | — | 97 | 100 | 74 | 97 | 100 | 57 |
| 4th Pref. Embodiment | 1.5 | — | 0.1 | — | — | — | 0.1 | — | — | — | — | 98 | 100 | 73 | 96 | 99 | 54 |
| 5th Pref. Embodiment | 1.5 | — | — | — | — | — | — | 0.1 | — | — | — | 97 | 100 | 77 | 97 | 100 | 59 |

TABLE 1-continued

| | Loading Amount, Noble Catalyst Ingredient (gram/liter) | | | | Dissolving Amount, Element (Alkali Metal, Alkaline-earth Metal, Rare-Earth Element) to be Dissolved in Titania (mole/liter) | | | | | | | Initial Conversion (%) | | | Conversion after Durability Test (%) | | |
|---|---|---|---|---|---|---|---|---|---|---|---|---|---|---|---|---|---|
| | Pt | Pd | Rh | La | Y | Ca | Sr | Ba | Li | Na | K | HC | CO | NOx | HC | CO | NOx |
| 6th Pref. Embodiment | 1.5 | — | — | — | — | — | — | — | 0.1 | — | — | 96 | 100 | 70 | 95 | 98 | 53 |
| 7th Pref. Embodiment | — | 3.0 | — | — | — | — | — | — | — | 0.1 | — | 93 | 100 | 68 | 91 | 97 | 50 |
| 8th Pref. Embodiment | — | 3.0 | — | — | — | — | — | — | — | — | 0.1 | 93 | 100 | 67 | 90 | 97 | 49 |
| Comp. Ex. No. 1 | 1.5 | — | — | 0.1 | — | — | — | — | — | — | — | 98 | 100 | 83 | 98 | 100 | 38 |
| Comp. Ex. No. 2 | 1.5 | — | — | — | 0.1 | — | — | — | — | — | — | 97 | 100 | 78 | 98 | 100 | 36 |
| Comp. Ex. No. 3 | 1.5 | — | 0.1 | — | — | 0.1 | — | — | — | — | — | 98 | 100 | 80 | 98 | 100 | 38 |
| Comp. Ex. No. 4 | 1.5 | — | 0.1 | — | — | — | 0.1 | — | — | — | — | 97 | 100 | 83 | 97 | 100 | 35 |
| Comp. Ex. No. 5 | 1.5 | — | — | — | — | — | 0.1 | — | — | — | — | 97 | 100 | 86 | 96 | 100 | 39 |
| Comp. Ex. No. 6 | 1.5 | — | — | — | — | — | — | 0.1 | — | — | — | 95 | 100 | 80 | 94 | 97 | 30 |
| Comp. Ex. No. 7 | — | 3.0 | — | — | — | — | — | — | — | 0.1 | — | 92 | 100 | 70 | 90 | 96 | 30 |
| Comp. Ex. No. 8 | — | 3.0 | — | — | — | — | — | — | — | — | 0.1 | 93 | 100 | 68 | 91 | 96 | 29 |

Examination for Purifying Performance

Each of the catalysts of the First Preferred Embodiment was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then in the 15-mode for another certain period of time, thereby examining the catalysts for the conversion of CO, HC and $NO_x$. The results of the evaluation are summarized in the columns designated at "Initial Conversion" in Table 1 below.

After the aforementioned evaluation, each of the catalysts of the First Preferred Embodiment was subjected to a bench test on durability which utilized the same type of engine as above. Namely, each of them was disposed in an exhaust line of the engine, and then the engine was run for 100 hours while adjusting the temperature of the exhaust gas introduced into them at 650° C. at an alternately repeated cycle of A/F 14.6 and A/F 22. After this bench test was over, each of them was again disposed in the exhaust line of the actual vehicle. The vehicle was driven in the same manner as described above, thereby examining the catalysts for the conversion of CO, HC and $NO_x$. The results of the evaluation are summarized in the columns designated at "Conversion after Durability Test" in Table 1.

Second through Eighth Preferred Embodiments

Except that the element to be dissolved in titania was changed from La to the alkali metal elements, the alkaline-earth metal elements or the rare-earth elements other than La as set forth in Table 1, that an aqueous solution of acetate or nitrate of the alkali metal elements, the alkaline-earth metal elements or the rare-earth elements other than La was used to prepare the titania solid solution, and that Pt, Pd, or Rh was employed as the noble metal catalyst ingredient, the catalysts of the Second through Eighth Preferred Embodiments were prepared in the same manner as those of the First Preferred Embodiment. Table 1 specifies the elements to be dissolved in titania, their dissolving amounts, and the loading amounts of the noble metal catalyst ingredients. Likewise, the resulting pulverized titania solid solution powders were subjected to an X-ray diffraction analysis. It was verified that the alkali metals, the alkaline-earth metals and the rare-earth elements other than La were dissolved in the titania.

The catalysts of the Second through Eighth Preferred Embodiments were examined for their exhaust gas purifying capabilities in the same manner as those of the First Preferred Embodiment were examined therefor. The results of the examinations are also set forth in Table 1.

Comparative Example Nos. 1 through 8

100 parts of an alumina powder, 70 parts of alumina sol containing alumina in an amount of 10% by weight, 15 parts of an aqueous aluminum nitrate solution containing aluminum nitrate in an amount of 40% by weight, and 30 parts of water were mixed, thereby preparing a slurry for coating.

Then, a plurality of the same honeycomb supports formed of cordierite as employed by the catalysts of the First Preferred Embodiment were immersed into the slurry, and thereafter each of them was blown to blow away the slurry in excess. Each of the supports was dried at 110° C. for 1 hour, and each of them was calcinated at 600° C. for 1 hour, thereby forming an alumina coating layer thereon. The alumina coating layer was thus coated on the honeycomb support in an amount of 120 grams with respect to 1 liter of the honeycomb support, thereby preparing a support having an alumina coating layer thereon.

Each of the honeycomb supports having an alumina coating layer thereon was immersed into an aqueous platinum dinitrodiammine solution having a predetermined concentration or an aqueous palladium nitrate solution having a predetermined concentration, and thereafter it was blown to blow away the water droplets in excess. After the blowing, each of the supports was dried at 250° C. for 1 hour, thereby loading Pt or Pd thereon. The loading amounts of Pt and Pd were summarized in Table 1.

Then, each of the honeycomb supports having a Pt or Pd-loaded alumina coating layer thereon was immersed into an aqueous solution of the alkali metal nitrate or acetate, the alkaline-earth metal nitrate or acetate, or the rare-earth element nitrate or acetate whose concentration was adjusted so as to load the alkali metal, the alkaline-earth metal and the rare-earth element on the honeycomb supports in the amounts summarized in Table 1. After drying, each of the honeycomb supports was dried at 110° C. for 1 hour, and thereafter it was calcinated at 500° C. for 1 hour. The catalysts of Comparative Example Nos. 1 through 8 were thus prepared.

The catalysts of Comparative Example Nos. 1 through 8 were examined for their exhaust gas purifying capabilities in the same manner as those of the First Preferred Embodiment were examined therefor. The results of the examinations are also set forth in Table 1.

Evaluation

It is appreciated from Table 1 that, although the catalysts of the First through Eighth Preferred Embodiments were inferior to those of Comparative Example Nos. 1 through 8 in terms of the initial $NO_x$ conversion, the catalysts of the First through Eighth Preferred Embodiments were far less likely to be degraded than those of Comparative Example Nos. 1 through 8 in terms of the $NO_x$ conversion after the durability test. Thus, the catalysts of the First through Eighth Preferred Embodiments were evidently far superior to those of Comparative Example Nos. 1 through 8 in terms of the $NO_x$ conversion after the durability test. It is apparent that this remarkable advantage produced by the catalysts of the First through Eighth Preferred Embodiments resulted from the employment of the titania solid solution for their supports.

Having now fully described the present invention, it will be apparent to one of ordinary skill in the art that many changes and modifications can be made thereto without departing from the spirit or scope of the present invention as set forth herein including the appended claims.

What is claimed is:

1. A process for purifying an exhaust gas from a lean-burn engine comprising sulfur oxides, carbon monoxide, hydrocarbons and nitrogen oxides, the process comprising:
bringing said exhaust gas into contact with an exhaust gas purifying catalyst comprising:
a support comprising a solid solution formed by dissolving an aqueous solution comprising at least one element selected from the group consisting of alkali metals and alkaline-earth metals in titania to form impregnated titania and burning said impregnated titania at a temperature greater than 600° C.; and
a noble metal catalyst ingredient loaded on the support;
wherein (1) under a lean-burn atmosphere in which oxygen concentrations are above a neutral point that is required for oxidizing components to be oxidized in said exhaust gas, nitrogen oxides and sulfur oxides in said exhaust gas are adsorbed to said solid solution; (2) said exhaust gas is periodically adjusted from lean-burn to fuel-rich, providing a reduction atmosphere in which oxygen concentrations are not greater than said neutral point; and (3) under said reduction atmosphere, nitrogen oxides adsorbed to said solid solution are chemically reduced by a reaction with hydrocarbons and carbon monoxide in said exhaust gas and sulfur oxides adsorbed to said solid solution are released.

2. The process according to claim 1, wherein said at least one element is dissolved in said titania in an amount of from 0.0.1 to 0.2 mole of said at least one element with respect to 100 grams of said titania.

3. The process according to claim 2, wherein said at least one element is dissolved in said titania in an amount of from 0.05 to 0.1 moles of said at least one element with respect to 100 grams of said titania.

4. The process according to claim 1, wherein said catalyst ingredient is loaded on said support in an amount of from 0.5 to 3.0 g of said catalyst ingredient with respect to 1 liter of said support.

5. The process according to claim 4, wherein said catalyst ingredient is loaded on said support in an amount of from 1.0 to 2.0 g of said catalyst ingredient with respect to 1 liter of said support.

6. The process according to claim 1, wherein said at least one element is selected from the group consisting of Ca, Sr, Ba, Li, Na and K.

7. The process according to claim 1, wherein said noble metal catalyst ingredient is at least one element selected from the group consisting of Pt, Pd and Rh.

8. The process according to claim 1, wherein said solid solution consists essentially of said titania and said at least one element.

9. The process according to claim 1, wherein said solid solution is formed by burning at a temperature of not less than 800° C.

10. A process for purifying an exhaust gas from a lean-burn engine comprising sulfur oxides, carbon monoxide, hydrocarbons and nitrogen oxides, the process comprising:
bringing said exhaust gas into contact with an exhaust gas purifying catalyst comprising:
a support comprising a solid solution consisting of titania and at least one element selected from the group consisting of alkali metals, alkaline-earth metals and rare-earth elements, said rare-earth element being selected from the group consisting of La, Pr, Nd, Pm, Sm, Eu, Gd, Tb, Dy, Ho, Er, Tm, Yb, Lu, Sc and Y, wherein said solid solution is formed by dissolving an aqueous solution of said at least one element in titania to form impregnated titania and burning said impregnated titania at a temperature greater than 600° C.; and
a noble metal catalyst ingredient loaded on the support;
wherein (1) under a lean-burn atmosphere in which oxygen concentrations are above a neutral point that is required for oxidizing components to be oxidized in said exhaust gas, nitrogen oxides and sulfur oxides in said exhaust gas are adsorbed to said solid solution; (2) said exhaust gas is periodically adjusted from lean-burn to fuel-rich, providing a reduction atmosphere in which oxygen concentrations are not greater than said neutral point; and (3) under said reduction atmosphere, nitrogen oxides adsorbed to said solid solution are chemically reduced by a reaction with hydrocarbons and carbon monoxide in said exhaust gas and sulfur oxides adsorbed to said solid solution are released.

11. The process according to claim 10, wherein said at least one element is dissolved in said titania in an amount of from 0.01 to 0.2 mole of said at least one element with respect to 100 grams of said titania.

12. The process according to claim 11, wherein said at least one element is dissolved in said titania in an amount of from 0.05 to 0.1 moles of said at least one element with respect to 100 grams of said titania.

13. The process according to claim 10, wherein said catalyst ingredient is loaded on said support in an amount of from 0.5 to 3.0 g of said catalyst ingredient with respect to 1 liter of said support.

14. The process according to claim 13, wherein said catalyst ingredient is loaded on said support in an amount of from 1.0 to 2.0 g of said catalyst ingredient with respect to 1 liter of said support.

15. The process according to claim 10, wherein said at least one element is selected from the group consisting of La, Y, Ca, Sr, Ba, Li, Na and K.

16. The process according to claim 10, wherein said noble metal catalyst ingredient is at least one element selected from the group consisting of Pt, Pd and Rh.

17. The process according to claim 10, wherein said solid solution is formed by burning at a temperature of not less than 800° C.

18. The process according to claim 1, wherein said at least one element is an alkaline-earth metal.

19. The process according to claim 1, wherein said solid solution consists of titania and said at least one element.

* * * * *